(12) United States Patent
Bonicatto

(10) Patent No.: US 9,647,495 B2
(45) Date of Patent: May 9, 2017

(54) POWER LOAD CONTROL WITH DYNAMIC CAPABILITY

(75) Inventor: Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 1330 days.

(21) Appl. No.: 13/536,187

(22) Filed: Jun. 28, 2012

(65) Prior Publication Data

US 2014/0001845 A1    Jan. 2, 2014

(51) Int. Cl.
H02J 3/14      (2006.01)
H02J 13/00     (2006.01)
H02J 3/00      (2006.01)

(52) U.S. Cl.
CPC ............ *H02J 13/0086* (2013.01); *H02J 3/14* (2013.01); *H02J 2003/001* (2013.01); *Y02B 70/3225* (2013.01); *Y04S 20/222* (2013.01); *Y10T 307/25* (2015.04)

(58) Field of Classification Search
CPC ........................................................ H02J 3/14
USPC ............................................ 307/38; 700/292
See application file for complete search history.

(56) References Cited

U.S. PATENT DOCUMENTS

| | | |
|---|---|---|
| 3,906,242 A | 9/1975 | Stevenson |
| 3,950,675 A | 4/1976 | Weber et al. |
| 4,023,043 A | 5/1977 | Stevenson |
| 4,385,241 A | 5/1983 | Peddie et al. |
| 4,415,943 A | 11/1983 | Wortman et al. |
| 5,581,229 A | 12/1996 | Hunt |
| 5,642,000 A | 6/1997 | Jean-Jumeau et al. |
| 6,154,488 A | 11/2000 | Hunt |
| 6,177,884 B1 | 1/2001 | Hunt et al. |
| 6,219,591 B1 | 4/2001 | Vu et al. |
| 6,496,342 B1 | 12/2002 | Horvath et al. |
| 6,633,823 B2 | 10/2003 | Bartone et al. |

(Continued)

FOREIGN PATENT DOCUMENTS

WO    2012045498 A1    4/2012

OTHER PUBLICATIONS

Lockheed Martin Aspen, "*Demand Response Enabling Technology for Small-Medium Businesses*", Apr. 12, 2006, pp. 1-88.

(Continued)

*Primary Examiner* — Rexford Barnie
*Assistant Examiner* — Joseph Inge
(74) *Attorney, Agent, or Firm* — Crawford Maunu PLLC

(57) ABSTRACT

A load control device is directly connected to a power utility line carrying electrical power using alternating current (AC) and to a load provided by a device located at premises. At the load control device, values are monitored for one or more load-responsive parameters of the electrical power over a period of time. A nominal value is determined for each of the one or more load-responsive parameters based upon the monitored values over the period of time. Threshold values are determined for the one or more load-responsive parameters based upon an acceptable deviation from the corresponding nominal value. A load-responsive parameter is detected as being outside of the threshold values. The load control device is then used to interrupt the providing of power to the load in response to the one or more load-responsive parameters being detected as being outside of the threshold values.

11 Claims, 8 Drawing Sheets

(56) References Cited

U.S. PATENT DOCUMENTS

| | | | |
|---|---|---|---|
| 6,891,478 B2 | 5/2005 | Gardner | |
| 6,998,963 B2 | 2/2006 | Flen et al. | |
| 7,088,014 B2 | 8/2006 | Nierlich et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,242,114 B1 | 7/2007 | Cannon et al. | |
| 7,346,463 B2 | 3/2008 | Petite et al. | |
| 7,353,420 B2 * | 4/2008 | Tsai | G06F 1/08 377/78 |
| 7,355,301 B2 | 4/2008 | Ockert et al. | |
| 7,356,385 B2 | 4/2008 | Lenarduzzi et al. | |
| 7,412,304 B2 | 8/2008 | Uenou | |
| 7,429,806 B2 | 9/2008 | Bainbridge et al. | |
| 7,432,824 B2 | 10/2008 | Flen et al. | |
| 7,443,313 B2 | 10/2008 | Davis et al. | |
| 7,456,674 B2 * | 11/2008 | Oakland | G06F 1/10 327/291 |
| 7,468,661 B2 | 12/2008 | Petite et al. | |
| 7,561,977 B2 | 7/2009 | Horst et al. | |
| 7,582,985 B2 | 9/2009 | Murguia | |
| 7,582,986 B2 | 9/2009 | Folkers et al. | |
| 7,595,567 B1 | 9/2009 | Cannon et al. | |
| 7,603,203 B2 | 10/2009 | Zhang et al. | |
| 7,706,320 B2 | 4/2010 | Davis et al. | |
| 7,711,651 B2 | 5/2010 | Baraty | |
| 7,732,943 B2 | 6/2010 | Karlsson et al. | |
| 7,738,999 B2 | 6/2010 | Petite | |
| 7,742,393 B2 | 6/2010 | Bonicatto et al. | |
| 7,747,357 B2 | 6/2010 | Murdoch | |
| 7,774,282 B2 | 8/2010 | Baraty | |
| 7,774,530 B2 | 8/2010 | Haug et al. | |
| 7,778,737 B2 | 8/2010 | Rossi et al. | |
| 7,778,738 B2 | 8/2010 | Taft | |
| 7,791,468 B2 | 9/2010 | Bonicatto et al. | |
| 7,830,037 B2 | 11/2010 | Hirst | |
| 7,877,218 B2 | 1/2011 | Bonicatto et al. | |
| 7,978,059 B2 | 7/2011 | Petite et al. | |
| 7,996,116 B2 | 8/2011 | Wiszniewski et al. | |
| 8,073,573 B2 | 12/2011 | Chassin et al. | |
| 8,103,390 B2 | 1/2012 | Rodgers | |
| 8,144,816 B2 | 3/2012 | Bonicatto et al. | |
| 8,144,820 B2 | 3/2012 | Bonicatto | |
| 8,190,302 B2 | 5/2012 | Burt et al. | |
| 8,194,789 B2 | 6/2012 | Wolter et al. | |
| 8,204,632 B2 | 6/2012 | Abi-Samra | |
| 8,238,263 B2 | 8/2012 | Kohout et al. | |
| 2004/0148060 A1 | 7/2004 | Lee | |
| 2005/0125104 A1 | 6/2005 | Wilson et al. | |
| 2007/0222294 A1 | 9/2007 | Tsukida et al. | |
| 2008/0304595 A1 | 12/2008 | Haug et al. | |
| 2009/0234512 A1 * | 9/2009 | Ewing | H04L 12/10 700/295 |
| 2010/0072817 A1 | 3/2010 | Hirst | |
| 2010/0145534 A1 * | 6/2010 | Forbes, Jr. | G06Q 10/00 700/291 |
| 2010/0185338 A1 | 7/2010 | Montgomery et al. | |
| 2010/0244563 A1 | 9/2010 | Fleck | |
| 2010/0268579 A1 | 10/2010 | Momoh | |
| 2010/0298998 A1 | 11/2010 | Hamilton et al. | |
| 2010/0328023 A1 | 12/2010 | Thomson | |
| 2011/0066301 A1 | 3/2011 | Donolo | |
| 2011/0118890 A1 | 5/2011 | Parsons | |
| 2011/0118891 A1 | 5/2011 | Hirst | |
| 2011/0121952 A1 | 5/2011 | Bonicatto et al. | |
| 2011/0125657 A1 * | 5/2011 | Boss | G06Q 10/06 705/317 |
| 2011/0172841 A1 * | 7/2011 | Forbes, Jr. | G01D 4/004 700/292 |
| 2011/0176598 A1 | 7/2011 | Kohout et al. | |
| 2011/0190958 A1 | 8/2011 | Hirst | |
| 2011/0202194 A1 | 8/2011 | Kobraei et al. | |
| 2011/0218686 A1 | 9/2011 | McHann, Jr. et al. | |
| 2011/0249678 A1 | 10/2011 | Bonicatto et al. | |
| 2011/0264276 A1 | 10/2011 | Kressner et al. | |
| 2011/0301773 A1 | 12/2011 | Spitaels et al. | |
| 2012/0016531 A1 | 1/2012 | Ganev et al. | |
| 2012/0035778 A1 | 2/2012 | Kong | |
| 2012/0041612 A1 | 2/2012 | Abi-Samra | |
| 2012/0053744 A1 | 3/2012 | Manson | |
| 2012/0053746 A1 | 3/2012 | Drake et al. | |
| 2012/0057592 A1 | 3/2012 | Zeppetelle et al. | |
| 2012/0076212 A1 | 3/2012 | Zeppetelle et al. | |
| 2012/0083936 A1 | 4/2012 | Van Vliet et al. | |
| 2012/0084559 A1 | 4/2012 | Bonicatto | |
| 2012/0106664 A1 | 5/2012 | Bonicatto et al. | |

OTHER PUBLICATIONS

Cooper Power Systems, "*Multiple Load Enclosure LCR*," http://www.cooperindustries.com/content/public/en/power_systems/products/demand_response/load-control-receivers/multiple_load_lcr.benefits.html.

F. Banhart, "*The Formation of a Connection between Carbon Nanotubes in an Electron Beam*," Nano Letters, vol. 1, No. 6, pp. 329-332, (Apr. 2001).

Lockheed Martin Aspen, "*Demand Response Enabling Technology for Small-Medium Businesses*," pp. 1-88 (Apr. 12, 2006).

\* cited by examiner

POWER LOAD CONTROL WITH DYNAMIC CAPABILITY

OVERVIEW

The electrical grid delivers electrical power to consumers using an interconnected power network. Power stations/plants produce electricity from a number of different power sources including, but not limited to, combustible fuels, nuclear fission, water, solar energy and wind. Transmission lines deliver the electricity from the power stations to consumer's premises, which include residential and commercial buildings. Long distance transmission can be carried out using high voltage alternating current (AC) (e.g., on order of hundreds of kilovolts), which is useful for reducing energy loss. Substations include transformers for reducing the voltage (e.g., under 10,000 volts) for subsequent delivery to a local area. The voltage can be further reduced (e.g., down to 120-280 volts) using a local transformer, sometimes referred to as a transformer drum/can for its traditional drum-like shape or as a pad mount, for delivery to a consumer's premises.

There are a number of problems facing power producing and distributing (utility) companies. A particular set of problems relate to issues with variations in the delivered power and to the potential adverse effects of such variations on consumer equipment. For instance, under voltage can cause voltage regulation devices to fail, electric motors can seize or lock and other end user equipment may operate at reduced capacity or not at all. In another instance, the frequency of the AC power may deviate from the norm. This can also result in undesirable effects on end user equipment. These and other power-related parameters can be a symptom of excess demand for power relative to current power production.

The demand for power is subject to a wide range of fluctuations, and the peak power demand can sometimes outstrip the current power production. This discrepancy between power demand and production can also be caused or worsened by the uneven power production from certain power sources, such as wind or solar, and from equipment failure, such as downed power lines or failed transformers. The power demand can be met by increasing power production; however, this requires that the power utility company have excess capacity held in reserve. For instance, this can be standby generators that are only activated when demand peaks. This can be costly to implement, moreover, there may be a less than ideal time delay to activate the standby generators. An alternative is to lessen the demand by controlling electrical load levels (sometimes referred to as load shedding) by interrupting power to loads located at different premises, whether the premises are owned by a consumer or provider. In some instances, consumers can be offered a discount for agreeing to have power to their load interrupted.

Aspects of the present disclosure are directed toward methods, devices or systems for controlling power drawn by consumer loads in response to monitored load-based parameters.

SUMMARY

The present disclosure is directed to systems and methods for use with the control of loads in the context of an electrical grid for power distribution. These and other aspects of the present disclosure are exemplified in a number of illustrated implementations and applications, some of which are shown in the figures and characterized in the claims section that follows.

Various embodiments are directed to a load control device comprising a utility power line interface configured and arranged for directly connecting to, and providing power from, a power utility line carrying electrical power using alternating current (AC). An electrical load interface is configured and arranged to directly connect to a load generated by a device at a (consumer) premises and to provide the electrical power from the power utility line to the load. A monitor circuit is configured and arranged to monitor values for one or more load-responsive parameters of the electrical power from the power utility line. A processing circuit is configured and arranged to determine an acceptable range of values for each of the one or more load-responsive parameters based upon the monitored values over a period of time. The processing circuit is also configured and arranged to detect when one or more of the monitored values fall outside of the corresponding acceptable range of values, and to generate an interruption signal in response to detecting that the monitored values fall outside of the corresponding acceptable range of values. A power control circuit is configured and arranged to interrupt the providing of the electrical power from the power utility line to a load in response to the interruption signal.

Certain other embodiments of the present disclosure are directed toward a method for controlling power using a load control device that is directly connected to a power utility line carrying electrical power using alternating current (AC), and to a load provided by a device located at a (consumer) premises. The method includes monitoring, at the load control device, values for one or more load-responsive parameters of the electrical power over a period of time. A nominal value is determined for each of the one or more load-responsive parameters based upon the monitored values over the period of time. Threshold values are determined for the one or more load-responsive parameters based upon an acceptable deviation from the corresponding nominal value. A load-responsive parameter is detected as being outside of the threshold values. The load control device is then used to interrupt the providing of power to the load in response to the one or more load-responsive parameters being detected as being outside of the threshold values.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
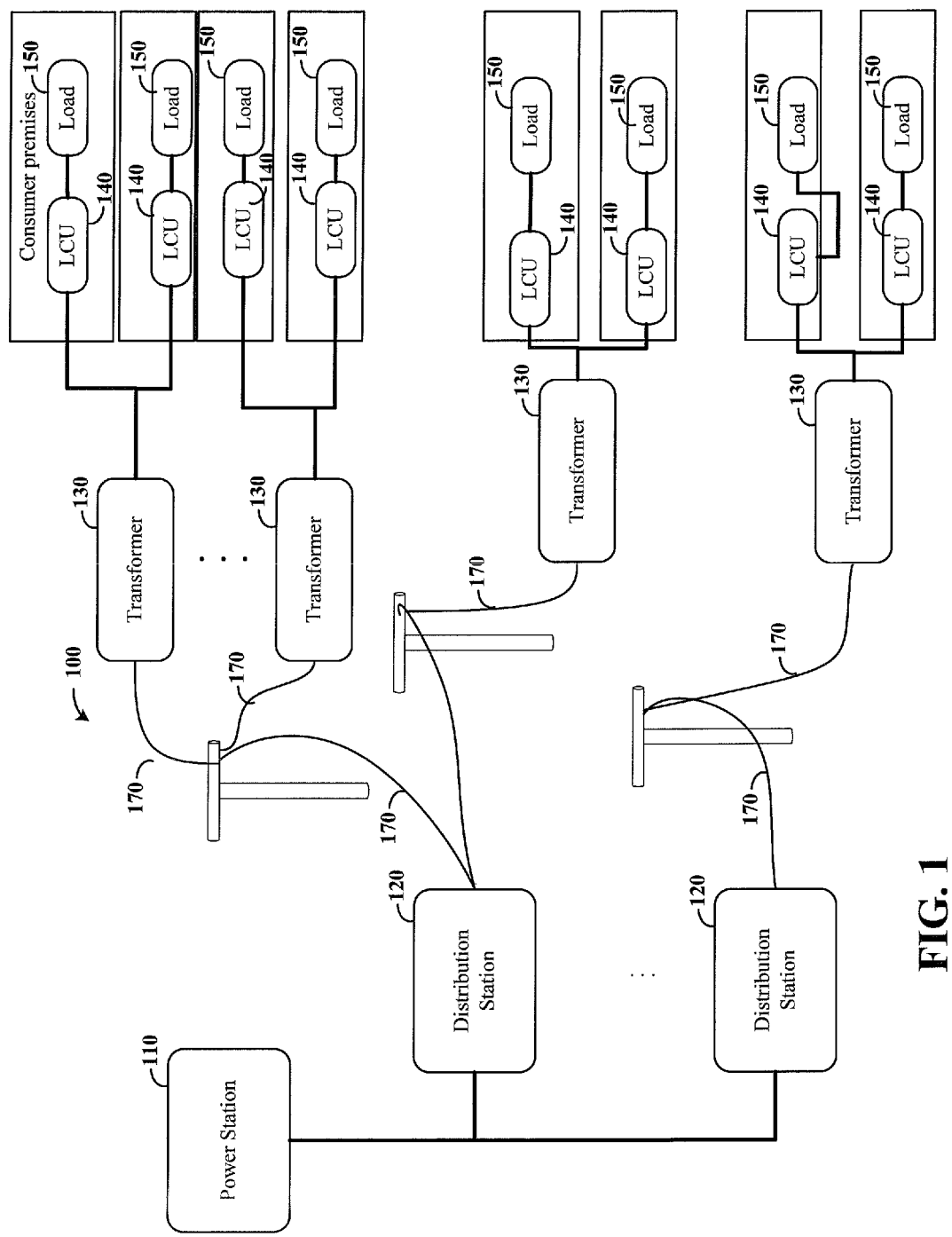
FIG. 1 shows a system containing a number of load control units (LCUs), consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for control of loads in a power distribution system. While the present disclosure is not necessarily limited to such applications, various aspects of the invention may be appreciated through a discussion of various examples using this context.

Aspects of the present disclosure are directed toward a load control unit that is configured to interrupt power to a load. The load control unit (LCU) is configured to be placed at a consumer premises where electrical power, from a power utility line, is provided to a load, and can also be provided to additional loads. In particular, the LCU can be configured to be connected directly to both the power utility line and to the load. As used herein, the LCU is directly connected to the power utility line and the load when there is no transformer between the LCU and the load, and when the load connection side of the LCU does not include break-out routing to other consumer premises. For instance, an LCU can be connected between a transform drum (providing 120V or 240V) and a load device, such as an air conditioning unit or a water heater. However, the LCU is not directly connected to a load when the connection branches to multiple consumer premises and their respective loads. Examples of consumer premises include a single family home, an apartment building and a commercial/retail building. Other embodiments allow for the use of LCUs at premises owned or operated by a utility provider.

Embodiments of the present disclosure relate to LCUs that monitor load-responsive parameters of the electrical power. Two prominent load-responsive parameters are the voltage and frequency of the power. Other load-responsive parameters can include duty cycle and/or waveform shape. The monitored load-responsive parameters can be used to provide dynamic control over power provided to the connected load. For instance, an LCU can be configured to detect a drop in voltage and to interrupt power to the connected load in response to the detected drop.

More particular embodiments are directed toward an automatic and/or dynamic adjustment of a nominal value for one or more load-responsive parameters. It has been recognized that strategic and careful use of such automated adjustments can be useful to compensate for a variety of different issues. For instance, power utility standards vary from country to country, e.g., either or both of the voltages and frequency can be different in the United States versus in Europe. In practice, values of the parameters are often not able to be set or maintained precisely at the values defined by the standards and/or at the values the standards define as an acceptable range.

A particular aspect of the present disclosure is based upon the recognition that load-responsive parameters, such as line voltage and/or frequency, can vary depending upon the particular country, utility company and/or consumer premises and can also vary over time. Accordingly, an LCU can be configured for use with a variety of different environments and for use at consumer premises. The LCU can measure one or more load-responsive parameter(s) and determine a nominal value for the load-responsive parameter. The nominal value represents a presumed or approximate value, rather than the actual or current value. As discussed in more detail herein, the nominal value can be determined from measured values using several different algorithms. A particular example of a nominal value is a mean value determined over a certain period of time. The nominal value can then be used as a reference point from which to determine if the load-responsive parameter is outside of an acceptable range of values. In response to making such a determination, the LCU can interrupt power provided to the corresponding load. The ability to self-discover the nominal value(s) at each LCU can be useful for a variety of reasons, one reason being that LCUs can be deployed in many different locations and environments with little or no customization.

Other aspects of the present disclosure are directed toward determining an acceptable range (or ranges) of values for load-responsive parameter(s). In a particular embodiment, the acceptable range can be determined by first calculating the standard deviation from the nominal (mean) value. The acceptable range can then be set to a certain number of standard deviations from the nominal value.

Certain aspects of the present disclosure are directed toward communication between the LCUs and a centralized controller, which can be operated by the utility company. This communication can be carried out over the power line and can be useful for a variety of different purposes including, but not necessarily limited to, training the LCU to set nominal and acceptable values, identifying problems (e.g., with the LCU, line or load), receiving LCU configuration information, and/or maintaining an inventory of deployed LCU devices.

In certain embodiments, the LCU can communicate wirelessly to another device that has a power line communication module. For instance, the LCU can communicate using a number of different protocols and mediums. For instance, LCU communications may be carried out using wireless communications in the industrial, scientific and medical (ISM) frequencies where the LCU is able to communicate while meeting any restrictions placed upon devices using these frequencies. For instance, the LCU could be configured to communicate with power/utility meter devices and endpoints having power line communication (PLC) interfaces in order to form ad-hoc networks using wired and/or wireless communications. This connection-based solution could be implemented as a propriety solution or using industry standards (e.g., 802.11, 802.14 and/or Zigbee).

In certain embodiments, the formation of such an ad hoc network can provide additional information for the LCU to use during self learning. For instance, a power meter can provide information about power being used at the consumer premises, which may correlate a corresponding changing in a load-responsive parameter. The LCU can then adjust the nominal value accordingly. In other instances, data can be provided to the LCU from a central control device or server using an endpoint device or from an associated meter. Consistent with other embodiments, the established network can be used to provide software updates to the LCUs or to otherwise adjust operational parameters.

Various embodiments are directed toward LCUs that are designed to communicate with one another after establishing an (ad-hoc) network for communication. The LCUs can then share information regarding load-responsive parameters to provide improved learning of nominal values and acceptable ranges for the parameters. Moreover, the LCUs can implement a fairness policy that ensures that load shedding is distributed fairly between the LCUs and therefore between different consumer premises. For instance, load shedding can be implemented using a round robin scheme in which a different LCU interrupts power to a load for each trigger event.

Turning now to the figures, FIG. 1 shows a system 100 containing a number of LCUs, consistent with embodiments of the present disclosure. Power station 110 generates power for delivery to one or more consumer premises. The power station 110 can include one or more power generation sources including power stations powered by combustible fuels, water, wind, nuclear energy and/or solar energy. High voltage (e.g., on the hundreds of kilovolts) alternating current (AC) lines can transmit power from the power station 110 to power distribution stations 120. Power distribution stations can lower the voltage (e.g., down to ten(s) of kilovolts) for local distribution of the AC power over power utility lines 170. Transformers 130 can further step down the voltage (e.g., down to 120 V or 240 V) for the final leg of the delivery to each consumer premises.

The demand of the different (consumer) premises can vary considerably. For instance, high heat can create a large demand due to cooling demands of air conditioning units. The ability to quickly compensate for varying demands is of critical importance to preventing potentially damaging variation in power parameters, such as over or under voltages. For example, excess demand may result in under voltage conditions that, if severe enough, would result in brownouts. Increasing the amount of power provided may be feasible in situations where the utility company has standby power generators and where none of the distribution lines/transformers is at or near their limits. This, however, is not always possible and often requires an acceptable amount of time before the backup generators can be brought online. Moreover, the utility company would be required to purchase and maintain sufficient backup generators.

A similar problem can occur when power generation is reduced due to uncontrollable factors. This is particularly prevalent in many types of renewable energy sources, which can vary in their effectiveness depending upon weather or other factors.

LCUs 140 can be configured to interrupt power to specific loads 150 at a consumer premises. Collectively, even though the individual loads 150 may not be individually significant, the overall power demand can be reduced using a large number of LCUs 140. Consistent with certain embodiments, the LCUs 140 can interrupt power until the load-responsive parameters return to an acceptable level. This allows the excess demand to be reduced until such a time as the demand returns to normal and the problematic time period has passed.

Consistent with a first embodiment, power can be interrupted by completely removing power during the entire problematic time period. In this manner, the power of the associated loads is completely removed from the power demands. Consistent with another embodiment, power can be interrupted by periodically cycling the power. For instance, power can be interrupted for 10 minutes and then provided for 10 minutes in a repeating pattern. Once the power demand returns to normal, power can again be provided without interruption.

Aspects of the present disclosure recognize that LCUs can be configured and arranged for use with load devices that have control circuits that allow the load of the device to be disabled in response to a signal from the LCU. In this manner, the LCU's switch circuit for disabling the load provides the control signal to interrupt power and the load device disables power consumption by interrupting power to one or more power-drawing circuits.

Other embodiments can use a set of one or more rules to determine whether a particular LCU will interrupt power. For instance, it may not be necessary for all LCUs to turn off each time excess demand is detected. Accordingly, the LCUs may use a delay to determine how quickly to interrupt power after detecting a potential problem. The delay can be different between the LCUs, allowing increasingly more LCUs to interrupt power. If a sufficient number of LCUs have interrupted power, the power-providing parameter may return to an acceptable level and additional LCUs (those with a longer delay) will not interrupt power. In one instance, the delay is set to a particular value for each LCU. This can be useful for prioritizing LCUs according to their connected loads. For instance, a consumer may be provided with a larger discount/incentive for having a lower priority LCU in exchange for having the power interrupted more frequently. In other instances, the delay can vary so that different LCUs will interrupt power for different problem events. For instance, the delay can be randomized. Other embodiments allow a correlation between time of day or other additional factors to be considered in the rule set.

Aspects of the present disclosure recognize that preset trigger levels for power interruption can be problematic in situations where the load parameters vary between consumer premises. Such variance between premises can result in a particular LCU, or set of LCUs, repeatedly interrupting power before other LCUs. Over time, this can lead to a disproportionate amount of power interruption for certain consumers. Accordingly, self-learning of the nominal load-responsive parameters, for each LCU, can be particularly useful for avoiding such issues with preset trigger levels. A particular example of such variances is a voltage drop caused by relative distances between consumer premises and a local transformer. Consumer premises having a larger relative distance may have a corresponding longer length of power utility line and associated resistance and voltage drop.

Certain embodiments of the present disclosure are directed to an LCU that responds to a detected problem by interrupting power intermittently by, for example, activating and deactivating the power interruption circuit according to a periodic on-off cycle. The duty cycle of such on-off cycle can be controlled and modified according to a variety of parameters, at least one of which can be a monitored value for a load-responsive parameter. For instance, a processing circuit can be configured to increase the duty cycle (the increase relative to the time power is interrupted) based upon the monitored parameter being further from the nominal value. This can be particularly useful for electronic devices, acting as the load that can still function with intermittent power and to providing different levels of load shedding according to the current conditions.

Figure 2:
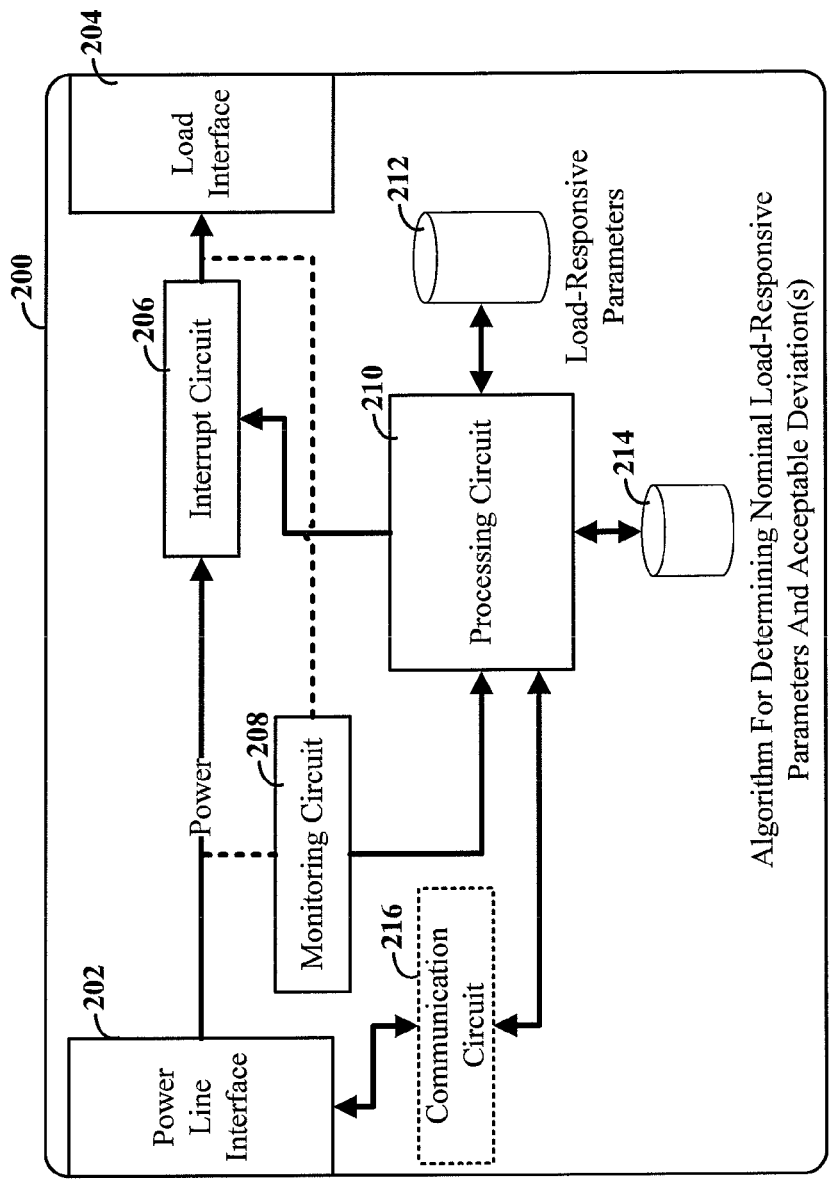
FIG. 2 depicts a block diagram for an LCU, consistent with embodiments of the present disclosure.

FIG. 2 depicts a block diagram for an LCU, consistent with embodiments of the present disclosure. LCU 200 includes a power line interface 202 and a load interface 204. These interfaces can be configured and arranged to directly connect to a power utility line and directly connect to a load. There is no transformer between the LCU and the load and the load connection side of the LCU does not include break-out routing to other consumer premises. In this manner, the LCU can interrupt power provided to the load interface 204 to interrupt power provided to a connected load without interrupting power to other consumer premises. For instance, an LCU could be connected between power from a power utility line and a consumer load (e.g., a heat pump or air conditioning unit). The presence of protection components, such as circuit breakers, between the interfaces and the power utility line or load does not affect whether or not the LCU is still directly connected thereto.

Power line interface 202 can be configured to receive power according to the needs of the particular load. For instance, a high-power load may require three phase power. The power line interface 202 can include a connection for either (or both) three wire or four wire (neutral fourth wire) solutions for providing the three phase power. In another instance, the power line interface can include a connection for split phase or single phase power. Load interface 204 can include corresponding connections for the specific type of power being provided to the load.

Monitoring circuit 208 monitors one or more load-responsive parameters of the power provided from power line interface 202 to load interface 204. Monitoring circuit 208 can monitor these parameters before interrupt circuit 206 and, in some cases, after interrupt circuit 206. Examples of the monitored parameters include, but are not necessarily limited to, voltage, frequency, duty cycle and/or waveform shape. In certain instances, a load-responsive parameter includes a root-mean-square (rms) value of the voltage for the provided power. Other parameters can include the peak voltage or frequency. Monitoring circuit 208 can provide the monitored values to processing circuit 210.

Monitoring circuit 208 can be implemented using a variety of different circuits and configurations and can include specially-programmed circuits, discrete hardware components and/or specially-configured programmable logic. A non-limiting example includes an analog-to-digital converter (ADC) that generates a digital representation of the voltages for the provided power. The digital representation can then be provided directly to the processing circuit 210. In another instance, monitoring circuit 208 can provide an analog representation of one or more load-responsive parameters. For instance, the measured voltage across a series resistor, or the output of a hall-effect sensor, could be used to measure current. These examples are not necessarily limiting and other circuits are possible. A more complex monitoring circuit 208 can perform calculations and/or filtering to provide preliminary processing functions.

Processing circuit 210 receives the monitored values from monitoring circuit 208. These received values can be stored in memory circuit/database 214. Processing circuit 210 can then determine a nominal value for one or more load-responsive parameters 212. This can be accomplished using an appropriate algorithm, which can be stored in a memory circuit/database 214. Alternatively, the algorithm can be carried out using programmable logic, specially-designed circuit hardware and/or combinations thereof. A particular example algorithm is an algorithm that determines the arithmetic mean of a load parameter over a period of time. Other algorithms are also possible, some of which are discussed in more detail herein.

In addition to determining a nominal value, the processing circuit 210 can determine an acceptable range of values for one or more load-responsive parameters. This acceptable range can be determined relative to (e.g., as a deviation from) the determined nominal value. The acceptable range can be defined as being within a set of threshold values. In a particular example, the acceptable range is determined using a determined standard deviation from the nominal value. For instance, it may be acceptable for a measured voltage to be within three standard deviations.

After an initial self learning phase, processing circuit 210 can then monitor subsequent load-responsive parameters in order to detect whether or not the load-responsive parameter is outside of the acceptable range (e.g., it exceeds the threshold values). In response to detecting that the load-responsive parameter is outside of the acceptable range, the processing circuit 210 can activate interrupt circuit 206.

Interrupt circuit 206 is configured and arranged to allow selective interruption of power provided from power line interface 202 to load interface 204. Consistent with embodiments of the present disclosure, power can be interrupted using a switch/relay to break the circuit between the power line interface 202 and the load interface 204. In certain embodiments, the switch can provide a control signal to deactivate the load device.

Once power has been interrupted, processing circuit 210 can detect whether or not the load-responsive parameter is outside of the threshold values. If the load-responsive parameter is detected as being back inside of the threshold values, processing circuit 210 can deactivate interrupt circuit 206 to allow power to be provided to load interface 204. Consistent with certain embodiments of the present disclosure, processing circuit 210 can use different threshold values for deactivating interrupt circuit 206 (or hysteresis). This can be particularly useful for reducing oscillation between power being provided and power interrupted. Various embodiments can also require that the measured parameter exceed or be within the threshold values for a minimum time period before the interrupt circuit changes state (between active and inactive states).

Consistent with certain optional embodiments, the LCU 200 can include a communication circuit 216. This communication circuit can be configured and arranged to communicate over power utility lines using the power line interface 202. As discussed in more detail herein, other types of communication circuits are also possible. The communicated data can be used for a variety of purposes including, but not necessarily limited to, training the LCU during self learning, providing the status of LCU (e.g., active vs. inactive), diagnostics of the LCU or line conditions, software updates and/or inventory management of LCUs in the field.

Figure 3:
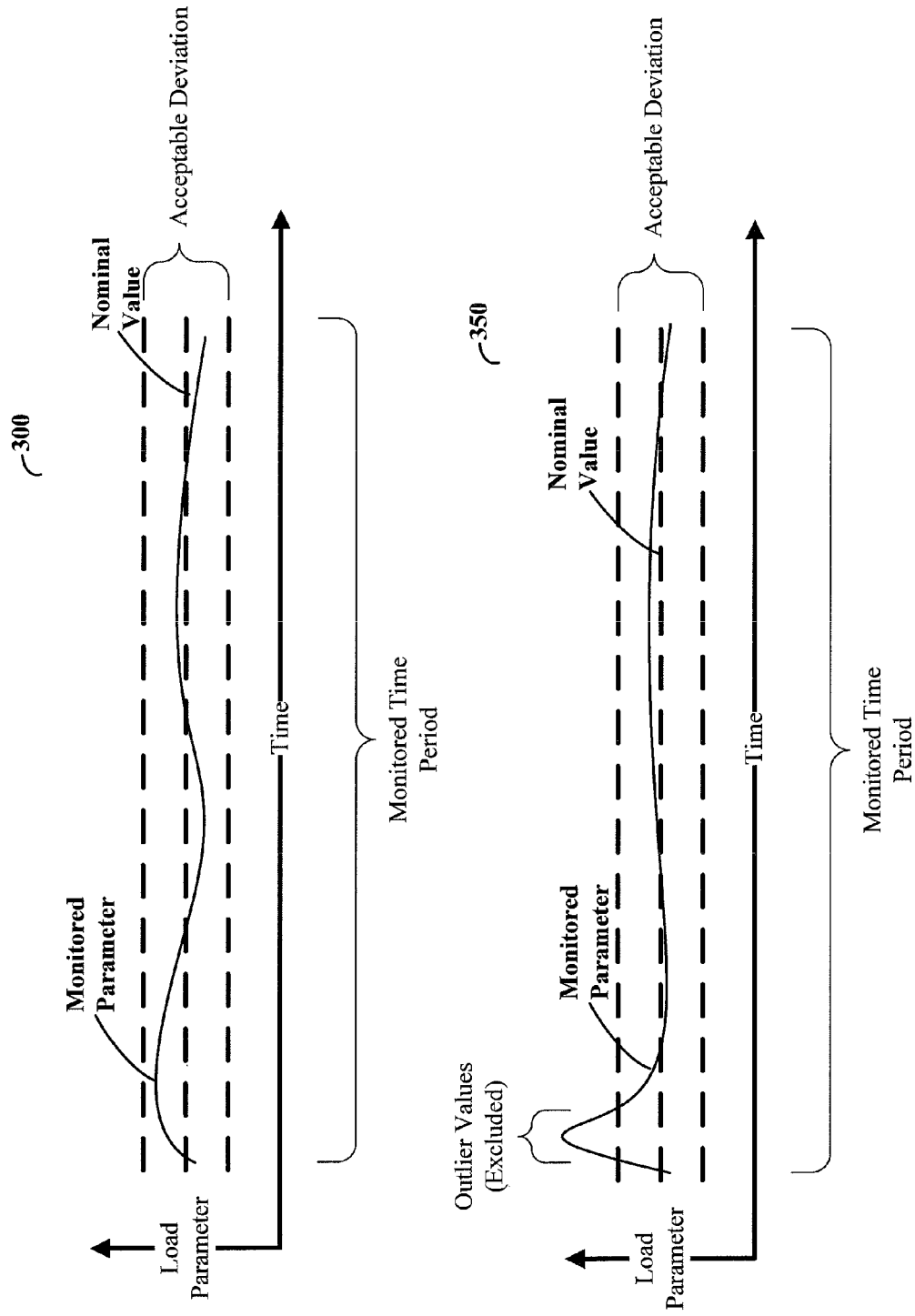
FIG. 3 depicts graphs for self learning by an LCU, consistent with embodiments of the present disclosure.

FIG. 3 depicts graphs for self learning by an LCU, consistent with embodiments of the present disclosure. Graph 300 depicts levels for load-responsive parameter (vertical axis) over time (horizontal axis). The monitored parameter (solid line) represents a measured value received from a monitoring circuit of the LCU. In a particular example, this value could be an RMS voltage. For ease of discussion the parameter will be discussed in terms of being a voltage, however, other load-responsive parameters could be monitored and used in similar manners.

Graph 300 shows that the voltage can vary over a monitored time period. The length of the monitored time period can be set based upon expected variations in the voltage. For instance, the voltage may be expected to vary depending upon the time of day. In such instances, the monitored time period can be set to 24 hours or more. In other instances, the voltage may also be expected to vary depending upon the day of the week (e.g., higher or lower voltage for weekend vs. weekday). In such instances, the monitored time period can be set to a week or more. Shorter time periods for the initial monitored period can also be used, recognizing a potential tradeoff between the speed of initialization and the accuracy of the monitored value.

Once the initial monitored period completes, a nominal value can be determined for the load-responsive parameter. The nominal value represents an expected or approximate value of the voltage, recognizing that the voltage varies over time. In a first example embodiment, the nominal value can be calculated as an arithmetic mean of the monitored value over the monitored time period. The nominal value could be determined using other algorithms and variations thereof, some of which are discussed in more detail herein.

Graph 300 also depicts an acceptable range of values that can be based at least partly upon the nominal value, and thus, represent an acceptable deviation from the nominal value. In certain embodiments, the acceptable deviation can be calculated by first determining the standard deviation from the nominal value. The acceptable value can then be set according to a number of standard deviations from the nominal value.

The above use of nominal values and acceptable deviations is also consistent with the standards for both power companies and electrical devices. For instance, many electrical devices are designed to work with one nominal voltage, while still being functional within a range of actual voltages. Such devices can also be designed for nominal and acceptable values of other parameters (e.g., frequency, power factor and AC waveform shapes).

Graph 350 depicts a variation on the initialization/self learning process for an LCU. Aspects of the present disclosure recognize that determinations of a nominal value can be skewed by a few measured values that lie an abnormal distance from other measured values in the sample (outlier values). Accordingly, the LCU can be configured to exclude outlier values from the determination of nominal value and/or of an acceptable deviation. As shown in graph 350, the outlier values appear as significant deviations from the voltage during the remaining portion of the monitored time period Depending upon the cause of the outlier values, the LCU can be configured to exclude these outlier values using various different mechanisms. One source of outlier values can be noise, which can either originate on the power utility line or be present in the internal circuitry of the LCU (or both). Such noise may cause short spikes in voltage to be measured. Accordingly, a low-pass filter can be used to exclude such spikes from the determination of a nominal voltage. In another example, the LCU can be configured to exclude any value that falls outside of a preset range (e.g., to exclude voltages that would be unacceptable in any known system).

Figure 4:
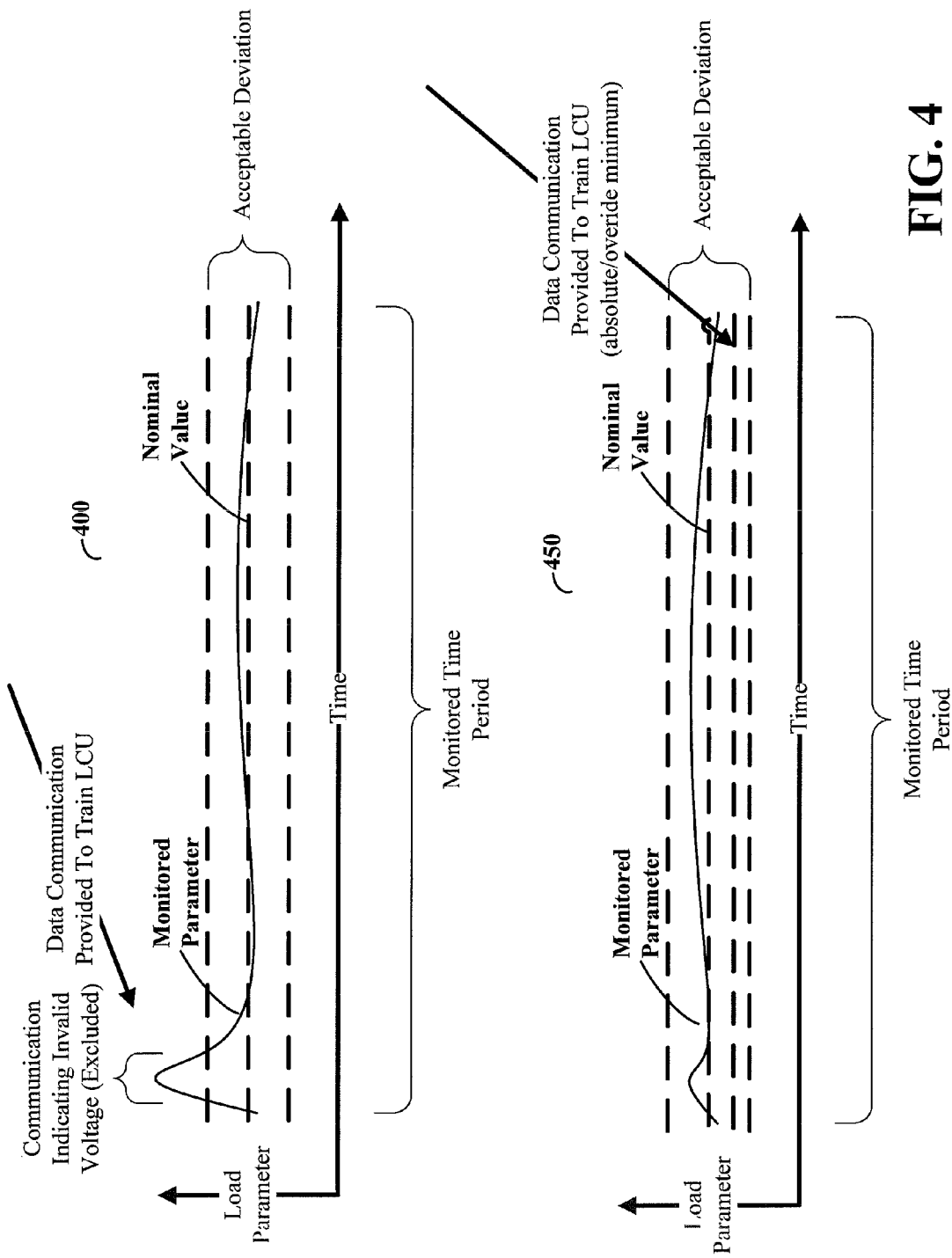
FIG. 4 depicts graphs for self learning by an LCU that uses data communications to self learn, consistent with embodiments of the present disclosure.

FIG. 4 depicts graphs for self learning by an LCU that uses data communications to self learn, consistent with embodiments of the present disclosure. As discussed herein, an LCU can include a communications circuit that allows receipt of data from external sources. In certain embodiments, this external data can be used to help train the LCU to self learn the nominal value and/or an acceptable deviation from the nominal value.

Graph 400 shows a first self learning example that is responsive to external communications. An external communication can provide data that indicates a period of time during which a measured voltage value should not be used. For instance, a power utility company may send out a broadcast communication to multiple (or even all) LCUs in response to detecting an under voltage condition caused by excess demand. Because the under voltage condition does not accurately represent the nominal/desired voltage for the provided power, the LCU can exclude the voltage measurements obtained during the indicated time. In another instance, the power utility company can provide an exclusion notification when performing maintenance that could result in voltage fluctuations.

Graph 450 shows a second self learning example that is responsive to external communications. In this example, the external communications can provide overriding information for values of the nominal voltage and/or acceptable range of voltages. For instance, the external communication can provide a voltage floor for which the LCU cannot set the acceptable range below. Other overriding information can include maximum or minimum nominal voltage values and/or a maximum acceptable voltage value.

Figure 5:
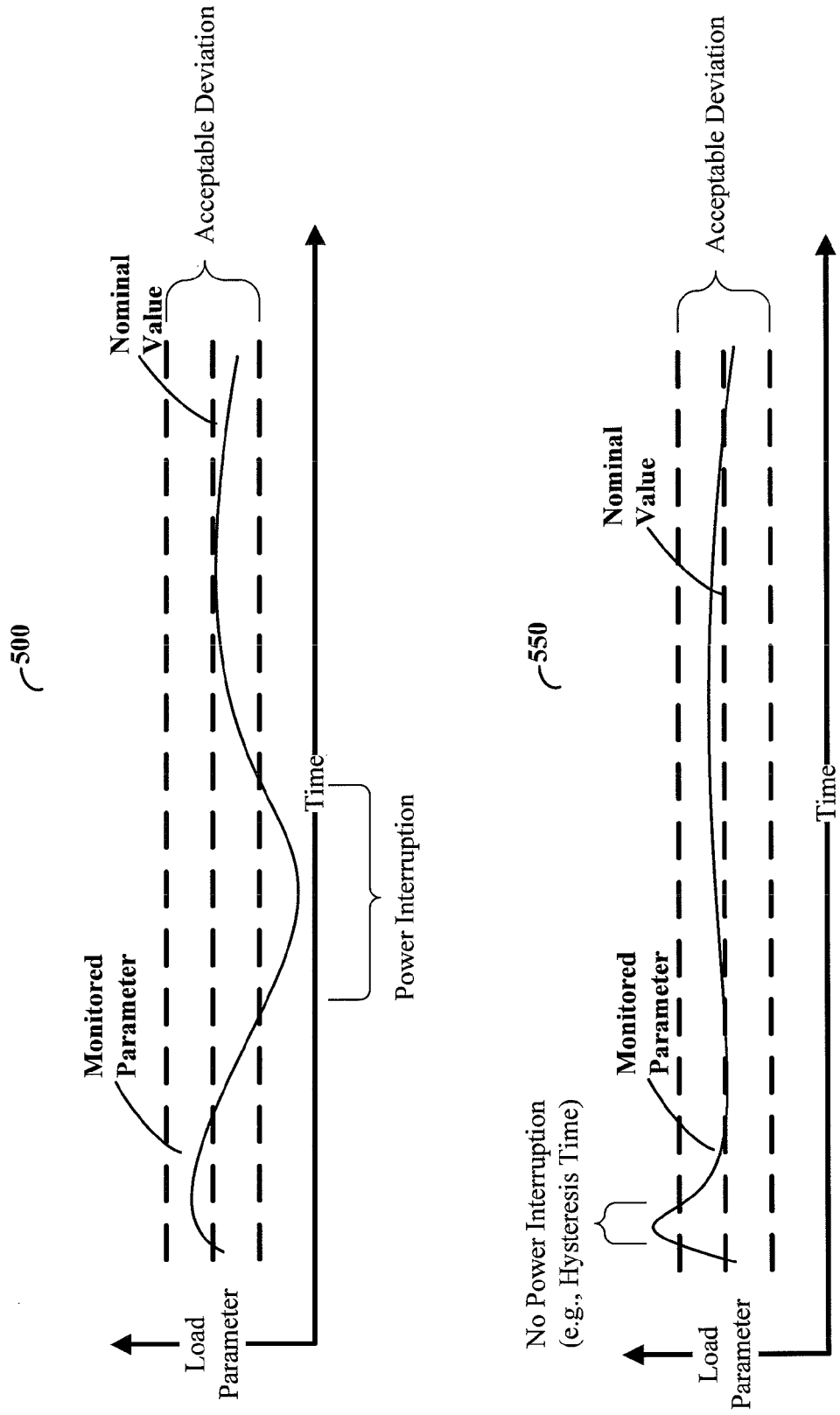
FIG. 5 depicts graphs showing active load control (shedding), consistent with embodiments of the present disclosure.

FIG. 5 depicts graphs showing active load control (shedding), consistent with embodiments of the present disclosure. Graph 500 shows a nominal value and an acceptable deviation that can be determined as discussed herein. The actual monitored value is also depicted. Graph 500 shows that when the actual monitored value exceeds (is outside of) the acceptable deviation, the LCU responds by interrupting power to a load. When the actual monitored value returns to a value within the acceptable deviation, the LCU responds by resuming power to the load.

Graph 550, however, shows that the actual monitored value exceeds (is outside of) the acceptable deviation but LCU does not interrupt power because the monitored value quickly returns to an acceptable value. This can be particularly useful for avoiding rapid and repeated cycling of power. For instance, brief power fluctuations may be caused by local changes in power (e.g., the load device changes its power demands and temporarily lowers or raises the local voltage). In other instances, brief power fluctuations may be caused by noise on the power line or within the LCU circuitry. Accordingly, the LCU may delay power interruption until and unless the monitored voltage exceeds the acceptable value for a certain period of time. An LCU can also use a low-pass filter to filter out brief voltage fluctuations. Various other heuristic methods can also be used.

Figure 6:
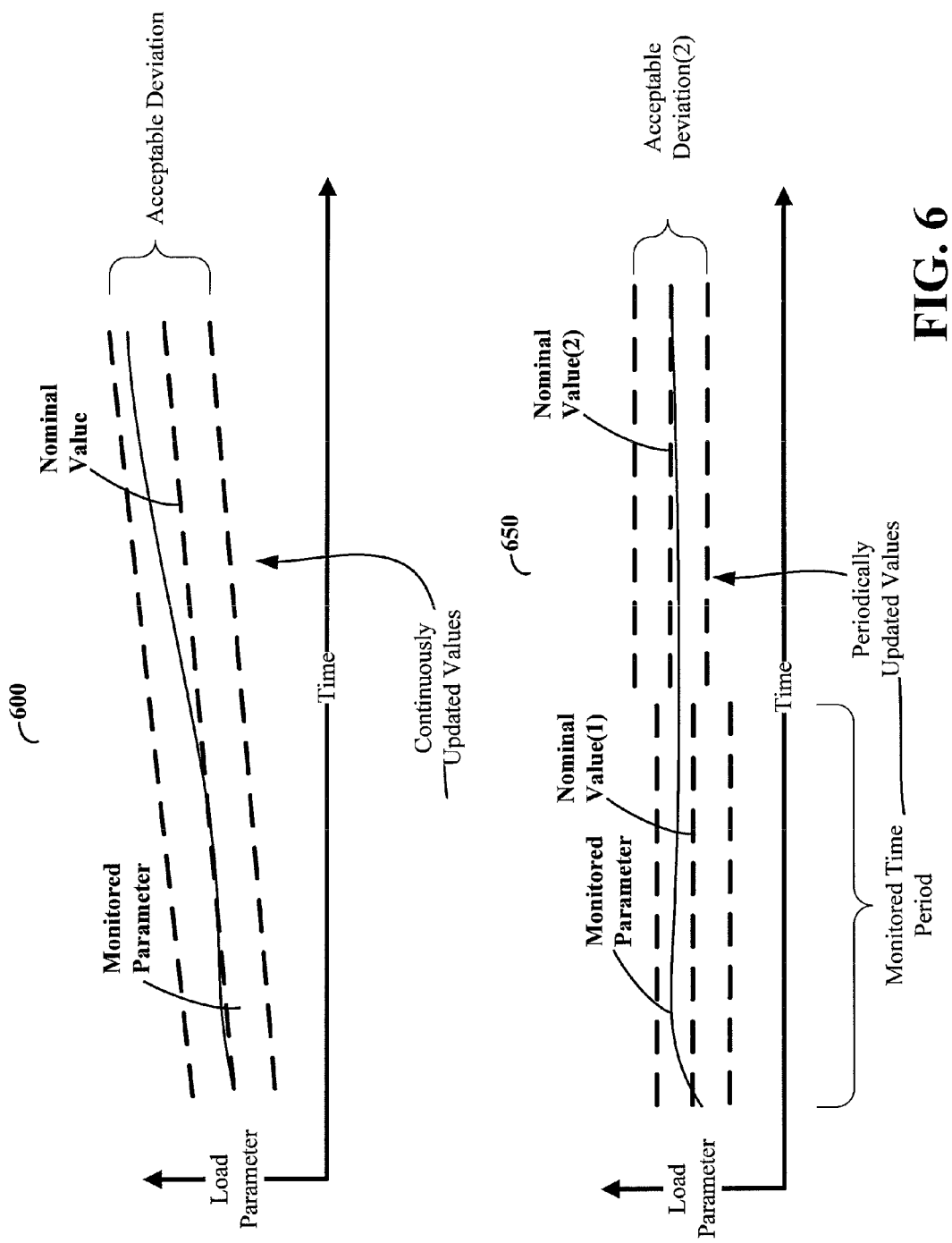
FIG. 6 depicts graphs for continuous or repeated self learning by an LCU, consistent with embodiments of the present disclosure.

FIG. 6 depicts graphs for continuous or repeated self learning by an LCU, consistent with embodiments of the present disclosure. Graph 600 shows an example in which an LCU continually updates each of the nominal value and the acceptable range over time. For instance, after an initial nominal value and the acceptable range are determined, the LCU can continually update the values based upon monitored values. This can be particularly useful for adjusting to gradual shifts in the load-responsive parameters, while still compensating for more rapid shifts. This can be particularly useful in situations where the gradual shifts occur as part of normal operation whereas more rapid shifts signify an undesired change that triggers load shedding by way of interrupting power to the load. A particular example embodiment uses a rolling mean or running average to account for gradual shifts. In some embodiments, the rolling mean can exclude values that fall outside of the acceptable range (e.g., to avoid skewing of the data due to under voltage events).

Graph 650 shows an example in which an LCU periodically updates each of the nominal value and the acceptable range. In this manner, a first nominal value(1) and acceptable deviation are used during a first time period. Thereafter, a second nominal value(2) and acceptable deviation(2) are used. This second set of values can be determined using the monitored values of the previous period. Other embodiments contemplate a triggered update, such as in response to an externally-received communication and/or to monitored values deviating from the nominal value by a certain amount and/or over a certain period of time.

Figure 7:
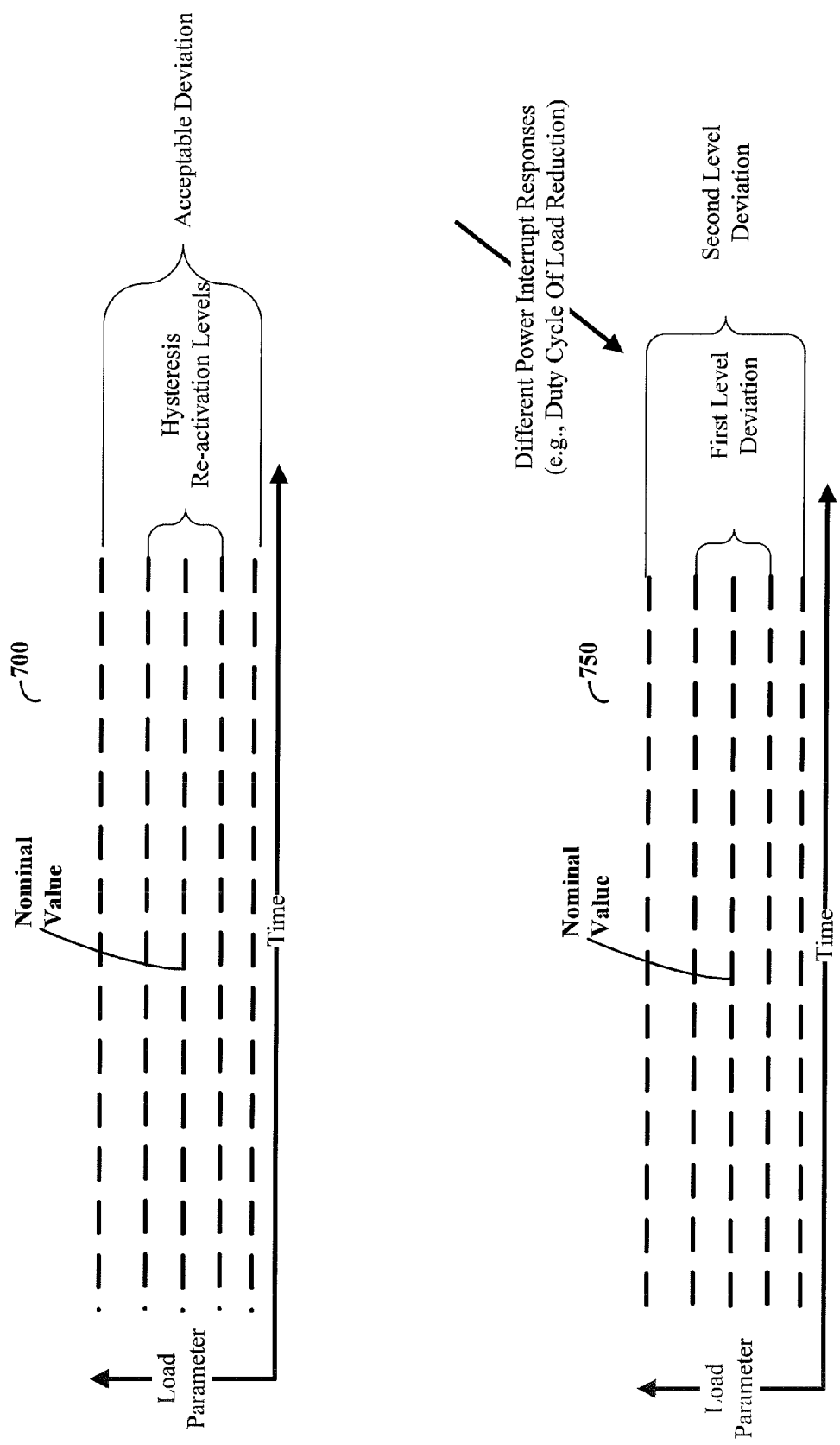
FIG. 7 depicts graphs showing an LCU configured to use multi-level thresholds, consistent with embodiments of the present disclosure.

FIG. 7 depicts graphs showing an LCU configured to use multi-level thresholds, consistent with embodiments of the present disclosure. In certain embodiments, the LCU can be configured and arranged to use multiple threshold values. In this manner the LCU can operate using a more complex and nuanced response to varying load parameters.

Graph 700 shows an example of multiple threshold levels being used to provide hysteresis for the power interruption to a load connected to the LCU. For instance, a first set of threshold values represents an acceptable deviation from the nominal value. If the monitored value exceeds this set of values, the LCU can interrupt power to the load. A second set of threshold values can be used to provide a different trigger point at which the LCU determines that power should again be provided to the load. This can be particularly useful for avoiding oscillations, such as may occur when the voltage is very near one of the values from the first set of threshold values.

Graph 750 shows an example of multiple threshold levels being used to provide different responses by the LCU. Thus, the LCU can perform different logical functions based upon whether a measured parameter exceeds a first deviation range or a second deviation range. One such logical function is setting a duty cycle for intermittent power interruption to a load.

The various features of the graphs of the aforementioned figures can be used individually or used in various different combinations. For example, multiple trigger thresholds of graph 700 can be used in conjunction with a low-pass filtering option of graph 550. Various other combinations are also possible.

Figure 8:
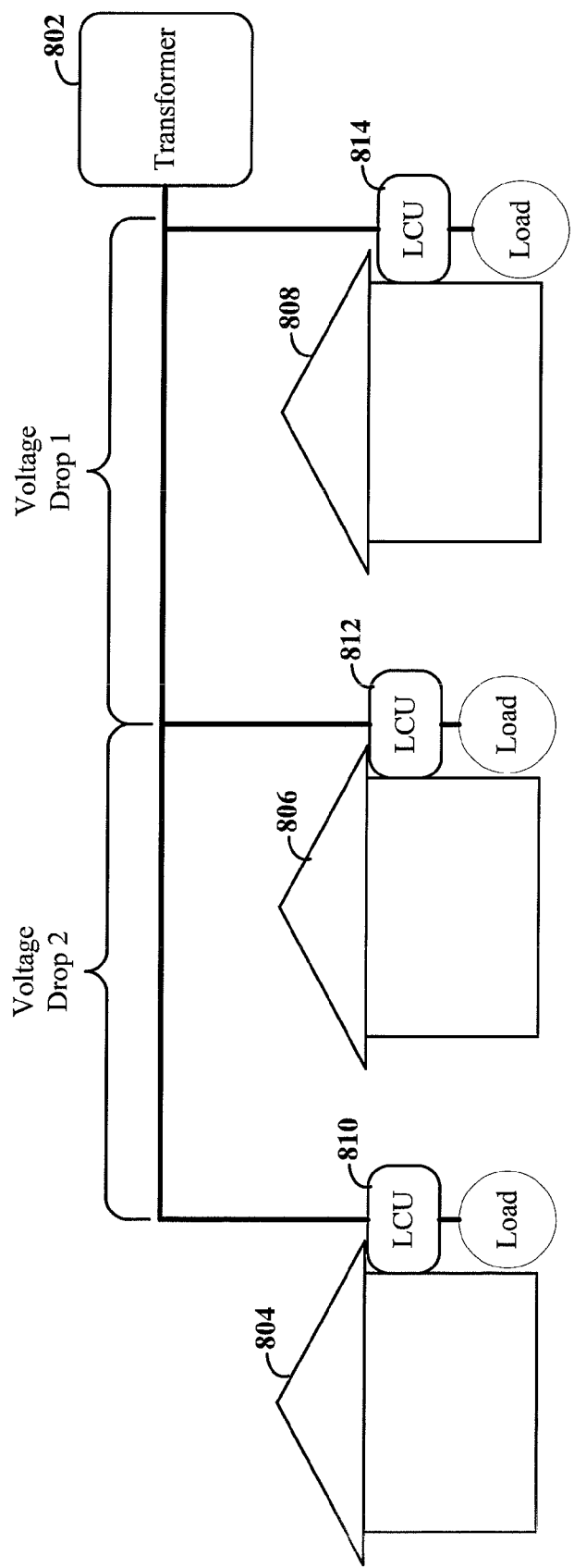
FIG. 8 depicts several consumer premises with LCUs, consistent with embodiments of the present disclosure.

FIG. 8 depicts several consumer premises with LCUs, consistent with embodiments of the present disclosure. Consumer premises 804, 806 and 808 are each provided power from transformer 802. The relative distances from transformer 802 results in corresponding voltage drops between the voltages provided to the consumer premises. Thus, consumer premise 808 is provided with a higher voltage than consumer premise 806, which is provided with a higher voltage than consumer premise 804. Aspects of the present disclosure recognize that this situation can create potential issues with LCUs 810, 812 and 814. Accordingly, the LCUs can be configured and arranged to compensate for such voltage drops.

Consistent with a first embodiment, the LCUs each self learn the nominal voltage at their corresponding consumer premises. In this manner, LCU 814 will learn a nominal voltage that is higher than that of LCU 812, which will learn a nominal voltage that is higher than that of LCU 810. The corresponding acceptable deviation for each LCU will also be self learned for each consumer premises. If all LCUs had the same settings, LCU 810 would always trigger first because its voltage starting point is lower. Accordingly, the self learning can be particularly useful for lessening or avoiding disparate power interruption between consumer premises.

In another instance, the power provided to each premises can vary in manners other than a strict voltage drop. For instance, the inductance, capacitance and resistance between each consumer premises and the transformer 802 can be different. This can result in different waveforms and/or in voltage spikes (or dips) being more prominent at the different consumer premises. Accordingly, each LCU may determine a different acceptable deviation range because, for example, the standard deviations are different due to the different responses to changes in voltage or current.

Consistent with certain embodiments, each LCU can be configured to establish an ad-hoc communication network and to communicate with one another in order to convey information regarding potential voltage drops between consumer premises. For instance, a processing circuit of the LCUs can be configured to share positional information. Each LCU can then determine their relative position and this relative position can be correlated to an expected and/or acceptable voltage drop. In this manner, the LCU can adjust its learning algorithm to account for its relative position. In certain embodiments, the expected voltage drop can be compared against the actual voltage drop and used to detect potential problems with the distributed power. For instance, an LCU can detect a problem when the nominal voltage is significantly different from the voltage resulting from an expected voltage drop. The LCU can be configured to communicate the potential problem to a utility company and/or to adjust its load shedding accordingly (e.g., by interrupting power to the load more often or not at all).

The signals and associated logic and functionality described in connection with the figures can be implemented in a number of different manners. Unless otherwise indicated, various general-purpose systems and/or logic circuitry may be used with programs in accordance with the teachings herein, or it may prove convenient to use a more specialized apparatus to perform the disclosed aspects. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations, and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, a block or module denoting "C=A+B" as an additive function implemented in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions, which may be used to program a computer (or other electronic devices) to perform a process according to the present disclosure. Accordingly, the computer-readable medium includes any type of media/machine-readable medium suitable for storing electronic instructions.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in FIG. 2. In certain embodiments, the programmable circuit is one (or more) computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

The various embodiments described above are provided by way of illustration and should not be construed to necessarily limit the invention. Based on the above discussion and illustrations, those skilled in the art will readily recognize that various modifications and changes may be made to the present invention without strictly following the exemplary embodiments and applications illustrated and described herein. For instance, such changes may include the use of different, or additional, load-responsive parameters. Such modifications and changes do not depart from the true spirit and scope of the present invention, including aspects set forth in the following claims.

What is claimed is:

1. A load control device comprising:
a utility power line interface configured and arranged for directly connecting to, and providing power from, a power utility line carrying electrical power using alternating current (AC);
an electrical load interface configured and arranged to directly connect to a load generated by a device, including circuitry, at a premises and to provide the electrical power from the power utility line to the load;
a monitor circuit configured and arranged to monitor values for one or more load-responsive parameters of the electrical power from the power utility line;
a wireless communication circuit;
a processing circuit configured and arranged to
detect other wireless devices, each including circuitry, using the wireless communication circuit,
form, in response to detecting the other wireless devices, an ad hoc network with the other wireless devices,
communicate, over the ad hoc network, data regarding an acceptable range of values for each of the one or more load-responsive parameters,
detect when one or more of the monitored values fall outside of a corresponding acceptable range of values,
adjust the acceptable range of values in response to positional information received from the other wireless devices, and
generate an interruption signal in response to detecting that the monitored values fall outside of the corresponding acceptable range of values; and
a power control circuit configured and arranged to interrupt the providing of the electrical power from the power utility line to a load in response to the interruption signal.

2. The device of claim 1, wherein the processing circuit is further configured and arranged to exchange positional information with the other wireless devices.

3. The device of claim 1, wherein the processing circuit is further configured and arranged to implement a fairness policy between the other wireless devices, the fairness policy defining which of the devices interrupts power to a respective load in response to detecting when one or more of the monitored values fall outside of the corresponding acceptable range of values.

4. The device of claim 1, wherein the processing circuit is further configured and arranged to receive software updates over the wireless communication circuit.

5. The device of claim 1, wherein the processing circuit is further configured and arranged to communicate with a central server through at least one of the other devices that is a utility meter with a power line communication interface.

6. The device of claim 1, wherein the monitor circuit includes an analog-to-digital converter (ADC) configured and arranged to provide a digital representation of the monitored values.

7. The device of claim 1, wherein the monitor circuit is further configured and arranged to provide a low-pass filter function for the monitored values.

8. The device of claim 1, wherein the processing circuit is further configured and arranged to generate the interruption signal to periodically interrupt the electrical power to the load according to a duty cycle defining the time that power is interrupted and not interrupted.

9. The device of claim 1, wherein the processing circuit is further configured and arranged to determine a mean value for the monitored values as a function of the period of time.

10. The device of claim 1, wherein the processing circuit is further configured and arranged to update the acceptable range of values using a running average of the monitored values.

11. A load control device comprising:
a utility power line interface configured and arranged for directly connecting to, and providing power from, a power utility line carrying electrical power using alternating current (AC);
an electrical load interface configured and arranged to directly connect to a load generated by a device, including circuitry, at a premises and to provide the electrical power from the power utility line to the load;

a monitor circuit configured and arranged to monitor values for one or more load-responsive parameters of the electrical power from the power utility line;

a wireless communication circuit;

a processing circuit configured and arranged to
- detect other wireless devices, each including circuitry, using the wireless communication circuit,
- form, in response to detecting the other wireless devices, an ad hoc network with the other wireless devices,
- communicate, over the ad hoc network, data regarding an acceptable range of values for each of the one or more load-responsive parameters,
- detect when one or more of the monitored values fall outside of a corresponding acceptable range of values, and
- generate an interruption signal in response to detecting that the monitored values fall outside of the corresponding acceptable range of values; and a power control circuit configured and arranged to interrupt the providing of the electrical power from the power utility line to a load in response to the interruption signal;

exchange data values, for one or more load-responsive parameters, with the other wireless devices and to generate the interruption signal based on the data values received from the other wireless devices; and a power control circuit configured and arranged to interrupt the providing of the electrical power from the power utility line to a load in response to the interruption signal.

* * * * *